United States Patent [19]
Maness

[11] 3,852,411

[45] Dec. 3, 1974

[54] METHODS FOR THE PREPARATION OF IMPROVED FAUJASITE COMPOSITIONS

[75] Inventor: Dale D. Maness, Austin, Tex.

[73] Assignee: Exxon Research and Engineering Company, Linden, N.J.

[22] Filed: July 28, 1972

[21] Appl. No.: 275,908

Related U.S. Application Data

[62] Division of Ser. No. 169,069, Aug. 4, 1971, Pat. No. 3,701,629.

[52] U.S. Cl.............. 423/329, 423/118, 423/328, 252/455 Z
[51] Int. Cl. ............... C01b 33/28, C01b 33/26
[58] Field of Search .......... 423/328, 329, 330, 118; 252/455 Z

[56] References Cited
UNITED STATES PATENTS

| | | | |
|---|---|---|---|
| 3,037,843 | 6/1962 | Mason | 423/118 |
| 3,101,251 | 8/1963 | Howell | 423/118 |
| 3,130,007 | 4/1964 | Breck | 423/328 |
| 3,374,182 | 3/1968 | Young | 423/328 X |
| 3,695,837 | 10/1972 | Sunderland et al. | 423/329 |
| 3,733,390 | 5/1973 | Robson | 423/118 |

Primary Examiner—Edward Stern
Attorney, Agent, or Firm—A. H. Krumhonz; Roy J. Ott

[57] ABSTRACT

Faujasite-type zeolites of high $SiO_2/Al_2O_3$ mole ratios are prepared utilizing a two-step process employing relatively abundant starting materials. The process includes an intermediate acidification step followed by a second holding period during which crystallization occurs.

6 Claims, No Drawings ature of, e.g., about 10° to 50°C., for up to about 3 hours. The final product con-
METHODS FOR THE PREPARATION OF IMPROVED FAUJASITE COMPOSITIONS This is a division, of application Ser. No. 169,069 filed Aug. 4, 1971 now U.S. Pat. No. 3,701,629 issued Oct. 31, 1972.

FIELD OF THE INVENTION

The present invention relates to a novel method for the preparation of crystalline aluminosilicate zeolites suitable for use in various hydrocarbon adsorption and/or conversion processes. More particularly, the present invention relates to the preparation of crystalline aluminosilicate zeolites of the faujasite-type, having a silica to alumina mole ratio of at least about 4.0.

Another embodiment of the present invention relates to the use of these zeolite materials in various hydrocarbon adsorption and/or conversion processes.

BACKGROUND OF THE INVENTION

Various processes for the preparation of crystalline aluminosilicate zeolites from silica and aluminum-containing materials have heretofore been proposed. Thus, for example, crystalline aluminosilicate zeolites having a silica to alumina mole ratio of about 2.5 to about 3.5 can be readily prepared by methods which in general involve digesting aqueous solutions of sodium silicate and sodium aluminate at elevated temperatures. The raw materials required for manufacturing these low-silica, crystalline aluminosilicate zeolites are relatively inexpensive. Previous attempts to prepare high-silica, crystalline aluminosilicate zeolites, i.e. having silica to alumina mole ratios greater than about 4.0, directly from inexpensive sources of silica, e.g. sodium silicate solutions, have however met with difficulty, see U.S. Pat. No. 3,227,660, column 2, and 3,484,194. In addition, such zeolites have recently been prepared from other crystalline aluminosilicate zeolites, as is disclosed in recently filed Ser. No. 104,745, to Harry E. Robson, quite successfully, but such processes have not always resulted in the preparation of crystalline aluminosilicate zeolites having as high a silica to alumina mole ratio as is desirable.

One of the well known methods for the manufacture of high-silica crystalline aluminosilicate zeolites requires a silica hydrosol as the major starting material. These hydrosols, as exemplified by the commercial "Ludox," are prepared by extensive ion exchanging of sodium silicate solutions. This procedure is quite expensive and thus the resulting silica hydrosols are several times as costly as sodium silicate, on an equivalent $SiO_2$ basis. Thus, for example, in U.S. Pat. No. 3,130,007, when it was desired to prepare a crystalline aluminosilicate having a silica to alumina mole ratio greater than 3.9, silica sources such as expensive aqueous colloidal silica sols were necessary as the major sources of silica.

Another method for producing crystalline aluminosilicate zeolites is described in U.S. Pat. No. 3,227,660. In this process, the patentees use sodium silicate as the major starting material, but need to convert it to a silica hydrogel by conventional methods, i.e. by acidifying a sodium silicate solution to a pH below about 10, and washing and partially drying the resulting hydrogel. Thus, in order to obtain high silica to alumina mole ratio products, the patentees found it necessary to use an added peptizing step wherein the silica hydrogel was partially peptized in an aqueous sodium hydroxide solution at an ambient temperature of, e.g., about 10° to 50°C., for up to about 3 hours. The final product contained only about 35 to 70% by weight of the desired high-silica, crystalline aluminosilicate zeolite.

In addition, U.S. Ser. No. 104,745 referred to hereinbefore, recently disclosed a valuable and inexpensive method for preparing such crystalline aluminosilicate zeolites utilizing other crystalline aluminosilicate zeolites as starting materials. This process utilizes alkali metal hydroxide solutions to convert the initial crystalline aluminosilicate zeolite materials, but is limited in the silica/alumina mole ratio of the product obtainable.

It is thus quite apparent that all these prior art processes demonstrate the difficulty encountered in preparing crystalline aluminosilicate zeolites of high purity and having silica to alumina mole ratios greater than about 4.0 inexpensively and in high yields.

SUMMARY OF THE INVENTION

In accordance with the present invention, it has been discovered that crystalline aluminosilicate zeolites of the faujasite type, and having silica to alumina mole ratios of at least about 4.0, can be prepared by the acidification of the zeolite-forming reaction mixture at a specific time during the zeolite preparation procedure. Further in accordance with the present invention, these high-silica crystalline aluminosilicate zeolite products may be utilized in various hydrocarbon conversion processes.

DETAILED DESCRIPTION

The crystalline zeolite preparation procedure of the present invention primarily consists of preparing a reaction mixture containing a source of silica, a source of alumina, a source of alkali metal oxide, and water, and may also include a promoter such as sodium chloride. The reaction mixture is then generally put into solution and thoroughly mixed at ambient temperature, e.g. 25°C, and heated to a temperature generally of from about 80° to about 150°C. Pressure must be applied at temperatures about 100°C. to prevent substantial loss of water from the reaction mixture. In the standard procedures employing such reaction mixtures for preparing crystalline aluminosilicate zeolites, these conventional mixtures have then generally been held at these high temperatures for a sufficient time to form a crystallized product. In the present invention, however, during this initial holding period the reaction mixture is acidified to a $Na_2O/SiO_2$ ratio of from 0.25 to about 0.40, preferably 0.32 to 0.38, and most preferably 0.34 to 0.36. The reaction mixture is then again held at the above noted temperatures during a second holding period for a further time in order to produce the crystalline zeolitic product.

In such procedures where the major source of silica in the reaction mixture is sodium silicate, silica gel or silicic acid, the reaction mixture will have a composition expressed in terms of oxide-mole ratios falling within the following ranges:

| | A | B | C |
|---|---|---|---|
| $Na_2O/SiO_2$ | 0.6 to 1.0 | 1.5 to 1.7 | 1.9 to 2.1 |
| $SiO_2/Al_2O_3$ | 8 to 30 | 10 to 30 | about 10 |
| $H_2O/Na_2O$ | 12 to 90 | 20 to 90 | 40 to 90 |

And where a promoter such as NaCl is added to this reaction mixture, the ratio of NaCl to $Al_2O_3$ in the mixture will generally be from about 0.5 to 5, preferably about 1.4. This mixture is then maintained at a temperature in the range of from about 25° to 150°C., preferably 80° to 130°C., and most preferably from about 90° to about 110°C. for a period of from 0.5 to about 5 hours, preferably about 1 to 2 hours, most preferably about 1½ hours, at which time the solution is acidified to a $Na_2O/SiO_2$ ratio of from 0.25 to about 0.40, preferably from 0.32 to 0.38 and most preferably from 0.34 to 0.36. This composition is then further maintained at a temperature in the range of from about 90° to about 110°C. for a period of from about 40 to about 231 hours, preferably 64 to 159 hours, and most preferably 90 to 110 hours.

In the process of the present invention wherein the sources of both silica and alumina comprise an initial crystalline aluminosilicate zeolite, and the initial reaction mixture includes an aqueous alkali metal hydroxide solution, generally utilizing high concentrations of alkali solution, preferably from 10 to 50% NaOH, and most preferably from 20 to 35% NaOH, this initial reaction mixture is maintained at from about 25° to 150°C., preferably 80° to 130°C., and most preferably from 90° to 110°C., for an initial period of from 0.5 to about 2.5 hours, preferably from 1 to 2 hours, and most preferably about 1.5 hours, at which time this solution is acidified to a $Na_2O/SiO_2$ mole ratio of from 0.30 to about 0.45, preferably from 0.32 to 0.38, and most preferably from 0.34 to 0.36. This solution is then additionally maintained at similar temperatures for a further period of from 8 to 40 hours, preferably from 10 to 24 hours, and most preferably from 15 to 17 hours, until the final crystallized product is formed.

This product, preferably being of the faujasite type, will have a $SiO_2/Al_2O_3$ mole ratio greater than about 4, preferably from about 4.2 to about 4.5, and most preferably greater than about 4.9.

The acidification step previously described will generally be carried out by the addition of an inorganic acid to the reaction mixture, preferably acids such as HCl, $HNO_3$, HBr and HCN, and most preferably an inorganic acid such as HCl.

DESCRIPTION OF THE PREFERRED EMBODIMENT

In an extremely important application of the present invention, the silica and alumina in the initial reaction mixture are supplied by the initial crystalline aluminosilicate zeolite clinoptilolite, one of the most abundant naturally-occurring zeolites, and treatment according to the process of the present invention results in the synthesis of a faujasite-type produce having a silica/alumina mole ratio greater than about 4, thus having a unit cell size below about 24.80 Angstroms.

Clinoptilolite is an extremely abundant natural crystalline aluminosilicate zeolite which has not been found useful for purposes of the adsorption or catalysis of hydrocarbons heretofore. The reason for this is the very low surface area of this material, and its concomitant lack of adsorptive capacity, irrespective of its high silica to alumina molar ratio of about 11. A review of the chracteristics of this material appears in the *American Minerologist*, Vol. 45, 1960, at pages 351–369, in an Article by F. A. Mumpton, which includes a review of the X-ray diffraction pattern of a clinoptilolite sample from Mt. Hector, California.

In order to prepare this faujasite product according to the present invention, utilizing the clinoptilolite as a starting material, an initial reaction mixture is prepared by blending the clinoptilolite with an alkali metal hydroxide in aqueous solution, such that the ratio of $H_2O$/zeolite employed will be from between about 0.3 g./g. to about 2.0 g./g., preferably from 0.5 to 1.5 g./g. and most preferably from 0.9 to 1.1 g./g. The alkali metal hydroxide concentration will be such as to comprise from 10 to 50% NaOH and preferably from 20 to 35% NaOH, thus giving a mole ratio of $Na_2O/SiO_2$, in terms of mole ratios of oxides, in the initial reaction mixture of from 0.20 to about 1.2, preferably from 0.40 to about 0.50.

This reaction mixture will then be heated to a temperature of from 90° to 110°C., and maintained at that temperature for a period of from 0.5 to 2.5 hours, preferably 1 to 2 hours.

The mixture will then be acidified by the addition of an acid, such as HCl, to provide a reaction mixture having a $Na_2O/SiO_2$ mole ratio of from 0.30 to about 0.45, preferably from 0.34 to 0.36, and most preferably of about 0.35. This reaction mixture will then be maintained at a temperature of from 90° to 110°C., for a period of from 15 to 17 hours, thus producing a crystallized faujasite-type crystalline aluminosilicate zeolite having a $SiO_2/Al_2O_3$ mole ratio greater than about 4, preferably from 4.2 to 4.8, and thus a unit cell size less than about 24.80 Angstroms, and preferably from 24.77 to 24.68 Angstroms.

The following Examples are representative of the processes of the present invention.

EXAMPLE 1

In order to further demonstrate the applicability of the present process to the preparation of faujasite from the initial crystalline aluminosilicate zeolite clinoptilolite, several runs were carried out with varying degrees of acidification according to the present process. The data obtained are contained in Table 1. In each of these runs, initially 10 grams of clinoptilolite was mixed well with 7 mls. of water and 6 grams of 50 wt. percent NaOH solution. This initial reaction mixture was then placed in a 4 ounce bottle, capped, and immersed in a 100°C. oil bath. The bottle was withdrawn from the bath and cooled to room temperature prior to acidification, and then re-capped and returned to the oil bath for the second holding period. Also in these runs, acidification was carried out after the initial holding period of 1½ hours, and after acidification, a second holding period of 16 hours was employed.

TABLE 1

| | Initial Zeolite | (Initial) $Na_2O/SiO_2$ | Added Acid | $Na_2O/SiO_2$ After Acidification | Products Faujasite | Crystallinity % | Unit Cell Size A | $SiO_2/Al_2O_3$ |
|---|---|---|---|---|---|---|---|---|
| 1) | Clinoptilolite[1] | 0.47 | None | — | Yes | 102 | 24.80 | 3.9 |
| 2) | do. | 0.47 | 1.30 mls. of 12N HCl | 0.45 | Yes | 99 | 24.768 | 4.19 |
| 3) | do. | 0.47 | 2.28 mls. of 12N HCl | 0.35 | Yes | 90 | 24.704 | 4.69 |
| 4) | do. | 0.47 | 3.25 mls. of 12N HCl | 0.3 | Yes | 15 | Too weak | To measure |

[1]Clinoptilolite from Mt. Hector, California

EXAMPLE 2

In order to determine the optimum length of time for the initial holding period, i.e. prior to acidification, several additional runs of varying initial holding periods were carried out in a manner similar to that described in Example 1, and the results are contained in Table 2.

These results indicate that an initial holding period of from 1 to 2 hours, and preferably of about 1½ hours, is most desirable for preparing a faujasite product of high $SiO_2/Al_2O_3$ mole ratio and of a high degree of crystallinity.

The general procedure employed in these runs for the formation of the initial reaction mixture included the use of 93.6 grams of $Al_2O_3·3H_2O$ as the source of alumina, 1,231 grams of a sodium silicate solution as the source of silica, 140 grams of NaOH, 50 grams of NaCl and 140 grams of water.

The data contained in Table 3 was obtained after an initial holding period of two hours, at 100°C. Run No. 11, i.e., with no acidification as per the present invention, was carried out utilizing a mole ratio of $Na_2O/SiO_2$ of 0.6, which is the lowest such ratio taught by Breck in U.S. Pat. No. 3,130,007 (see column 3, line 30).

TABLE 2

| | Initial Zeolite | (Initial) $Na_2O/SiO_2$ | Added Acid | Initial Holding Period at 100°C., Hrs. | $Na_2O/SiO_2$ After Acidification | Products | | | |
|---|---|---|---|---|---|---|---|---|---|
| | | | | | | Faujasite | Crystallinity % | Unit Cell Size A | $SiO_2/Al_2O_3$ |
| 5) | Clinoptilolite[1] | 0.47 | None | — | — | Yes | 102 | 24.80 | 3.9 |
| 6) | do. | 0.47 | 2.28 mls. 12N HCl | 1 | 0.35 | Yes | 47 | 24.708 | 4.66 |
| 7) | do. | 0.47 | 2.28 mls. 12N HCl | 1½ | 0.35 | Yes | 90 | 24.704 | 4.69 |
| 8) | do. | 0.47 | 2.28 mls. 12N HCl | 2 | 0.35 | Yes | 36 | 24.678 | 4.82 |
| 9) | do. | 0.47 | 2.28 mls. 12N HCl | 2½ | 0.35 | Yes | 23 | Too weak to measure | |
| 10) | do. | 0.47 | 2.28 mls. 12N HCl | 3 | 0.35 | Yes | 30 | Too weak to measure | |

[1]Clinoptilolite from Mt. Hector, California

TABLE 3

| | (Initial) $Na_2O/SiO_2$ | Added Acid | $Na_2O/SiO_2$ After Acidification | Products | | | |
|---|---|---|---|---|---|---|---|
| | | | | Faujasite | Crystallinity, % | Unit Cell Size, A | $SiO_2/Al_2O_3$ |
| 11) | 0.6 | None | — | Yes | 200 | 24.97 | <3.0 |
| 12) | 0.6 | 19 mls. 12N HCl | 0.35 | Yes | 74 | 24.704 | 4.69 |
| 13) | 0.6 | 25 mls. 12N HCl | 0.30 | Yes | 34 | Too weak to measure | |
| 14) | 0.6 | 27 mls. 12N HCl | 0.25 | Yes | 18 | Too weak to measure | |

EXAMPLE 3

In order to further demonstrate the scope of the present invention, several runs were carried out in which a faujasite-type zeolite product was prepared using sodium silicate solution as the source of silica, as per D. W. Breck in U.S. Pat. No. 3,130,007.

EXAMPLE 4

In order to determine the optimum length of time for the initial holding period, i.e., prior to acidification, several additional runs of varying initial holding periods were carried out in a manner similar to that described in Example 3, and the results obtained are contained in Table 4.

TABLE 4

| | (Initial) $Na_2O/SiO_2$ | Added Acid | Initial Holding Period at 100°C., Hrs. | $Na_2O/SiO_2$ After Acidification | Products | | | |
|---|---|---|---|---|---|---|---|---|
| | | | | | Faujasite | Crystallinity % | Unit Cell Size, A | $SiO_2/Al_2O_3$ |
| 15) | 0.60 | 19 mls. 12N HCl | 0 | 0.35 | Yes | 5 | Too weak to measure | |
| 16) | 0.60 | 19 mls. 12N HCl | 1 | 0.35 | Yes | 24 | Too weak to measure | |
| 17) | 0.60 | 19 mls. 12N HCl | 2 | 0.35 | Yes | 90 | 24.755 | 4.29 |
| 18) | 0.60 | 19 mls. 12N HCl | 3 | 0.35 | Yes | 57 | 24.759 | 4.26 |
| 19) | 0.60 | 19 mls. 12N HCl | 4 | 0.35 | Yes | 57 | 24.700 | 4.72 |
| 20) | 0.60 | 19 mls. 12N HCl | 5 | 0.35 | Yes | 19 | 24.671 | 4.96 |
| 21) | 0.60 | 19 mls. 12N HCl | 21¼ | 0.35 | Yes | 198 | 24.979 | <3.0 |

EXAMPLE 5

In order to further demonstrate the scope of the present invention, several additional runs similar to those shown in Examples 3 and 4 were carried out, but at a constant intial holding period, at 100°C., for two hours, and at varying second holding periods. The results of these runs are contained in Table 5.

TABLE 5

| | (Initial) $Na_2O/SiO_2$ | Added Acid | $Na_2O/SiO_2$ After Acidi-fication | Second Holding Period, Hrs. | Products | | | |
|---|---|---|---|---|---|---|---|---|
| | | | | | Faujasite | Crystal-linity, % | Unit Cell Size, A | $SiO_2/Al_2O_3$ |
| 22) | 0.60 | 19 mls. 12N HCl | 0.35 | 40 | Yes | 90 | 24.755 | 4.29 |
| 23) | 0.60 | 19 mls. 12N HCl | 0.35 | 64 | Yes | 74 | 24.704 | 4.69 |
| 24) | 0.60 | 19 mls. 12N HCl | 0.35 | 111 | Yes | 90 | 24.666 | 4.99 |
| 25) | 0.60 | 19 mls. 12N HCl | 0.35 | 159 | Yes | 112 | 24.653 | 5.09 |
| 26) | 0.60 | 19 mls. 12N HCl | 0.35 | 231 | Yes | 56 | 24.909 | 3.09 |

Obviously, many modifications and variations of this invention may be made without departing from the essence and scope thereof, and only such limitations should be applied as are indicated from the appended claims.

What is claimed is:

1. A method for preparing a faujasite-type zeolite from clinoptilolite crystalline aluminosilicate zeolite which comprises preparing an aqueous reaction mixture containing said clinoptilolite crystalline aluminosilicate zeolite, alkali metal hydroxide and water such that the ratio of water/zeolite in said mixture will be from between about 0.3 g./g. to about 2.0 g./g. and the mole ratio of $Na_2O/SiO_2$ in said mixture will be from about 0.40 to about 0.50, maintaining said reaction mixture at a temperature in the range of from about 25° to 150°C. for an initial holding period of from 0.5 to 2.5 hours, acidifying and thereby reducing the $Na_2O/SiO_2$ mole ratio of said reaction mixture so that the $Na_2O/SiO_2$ mole ratio is within the range of from 0.30 to 0.45, maintaining said reaction mixture for a second holding period of from 8 to 40 hours, and recovering a crystallized product having a silica/alumina mole ratio greater than about 4.

2. The method of claim 1 wherein the sodium $Na_2O/SiO_2$ mole ratio is reduced by acidification to a level within the range of 0.32 to 0.38.

3. The method of claim 1 wherein said alkali metal hydroxide comprises NaOH.

4. The method of claim 1 wherein said initial reaction mixture is maintained at a temperature of from 90 to 110°C.

5. The method of claim 1 wherein said initial holding period is from 1 to 2 hours.

6. The method of claim 1 wherein said acidification results in a mole ratio of $Na_2O/SiO_2$ of from 0.34 to 0.36.

* * * * *